(12) United States Patent
Uchida

(10) Patent No.: US 7,724,695 B2
(45) Date of Patent: May 25, 2010

(54) RADIO COMMUNICATION SYSTEM

(75) Inventor: Minoru Uchida, Yokohama (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 678 days.

(21) Appl. No.: 11/521,407

(22) Filed: Sep. 15, 2006

(65) Prior Publication Data

US 2007/0087750 A1 Apr. 19, 2007

(30) Foreign Application Priority Data

Sep. 26, 2005 (JP) .............................. 2005-277262

(51) Int. Cl.
*H04B 7/00* (2006.01)
*H04W 36/00* (2009.01)
(52) U.S. Cl. ..................................... 370/310; 455/436
(58) Field of Classification Search ................. 370/310; 445/436
See application file for complete search history.

(56) References Cited

U.S. PATENT DOCUMENTS

| 4,882,766 | A | * | 11/1989 | Akaiwa | ....................... 455/512 |
| 5,157,709 | A | * | 10/1992 | Ohteru | ....................... 455/465 |
| 5,754,955 | A | * | 5/1998 | Ekbatani | ................... 455/422.1 |
| 6,920,122 | B1 | * | 7/2005 | Hanaoka et al. | ............. 370/331 |
| 2002/0075835 | A1 | * | 6/2002 | Krishnakumar et al. | ..... 370/338 |
| 2003/0054839 | A1 | * | 3/2003 | Ono | ........................... 455/456 |

2004/0209621 A1 10/2004 Teshirogi

FOREIGN PATENT DOCUMENTS

| CN | 1538780 | 10/2004 |
| JP | 5-191856 | 7/1993 |
| JP | 06-303662 | 10/1994 |
| JP | 2003-250176 | 9/2003 |
| JP | 2004320602 | 11/2004 |
| JP | 2005-136779 | 5/2005 |

OTHER PUBLICATIONS

"Regional Digital Mobile Telecommunication System", ARIB STD-T79, ver. 1.0, Association of Radio Industries and Business, Jun. 6, 2001, pp. 1-24. (w/partial translation).

* cited by examiner

*Primary Examiner*—Vincent P Harper
*Assistant Examiner*—Timothy Pham
(74) *Attorney, Agent, or Firm*—Brundidge & Stanger, P.C.

(57) ABSTRACT

A radio communication system includes a line controller, a plurality of base stations connected to the line controller and a plurality of mobile stations connected to each of the plurality of base stations by radio communication line having control channel and communication channel, and each of the plurality of base stations includes a control unit for monitoring idle slot in the communication channel within a communication area of the base station. The control unit transmits the monitored information of the idle slot to the mobile station within the communication area of the base station at predetermined intervals by using the control channel and each mobile station can use an idle slot in the base station or, if there is no idle slot in the base station, in another base station based on the monitored information of the idle slot to make communication.

13 Claims, 12 Drawing Sheets

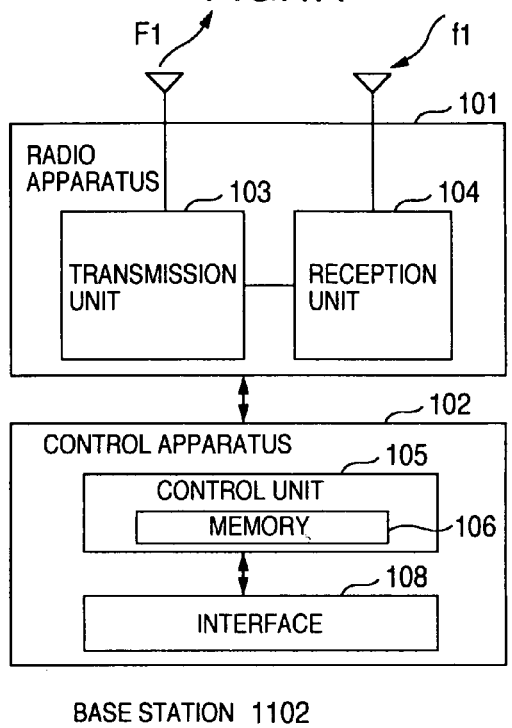
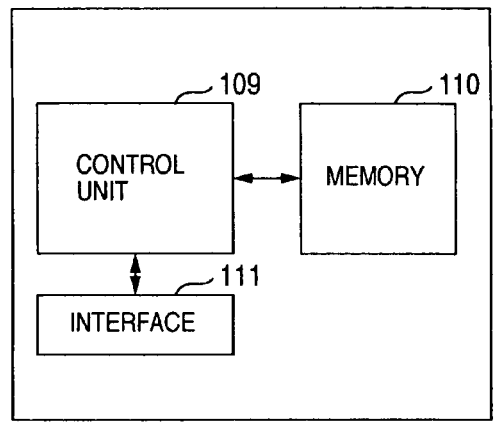
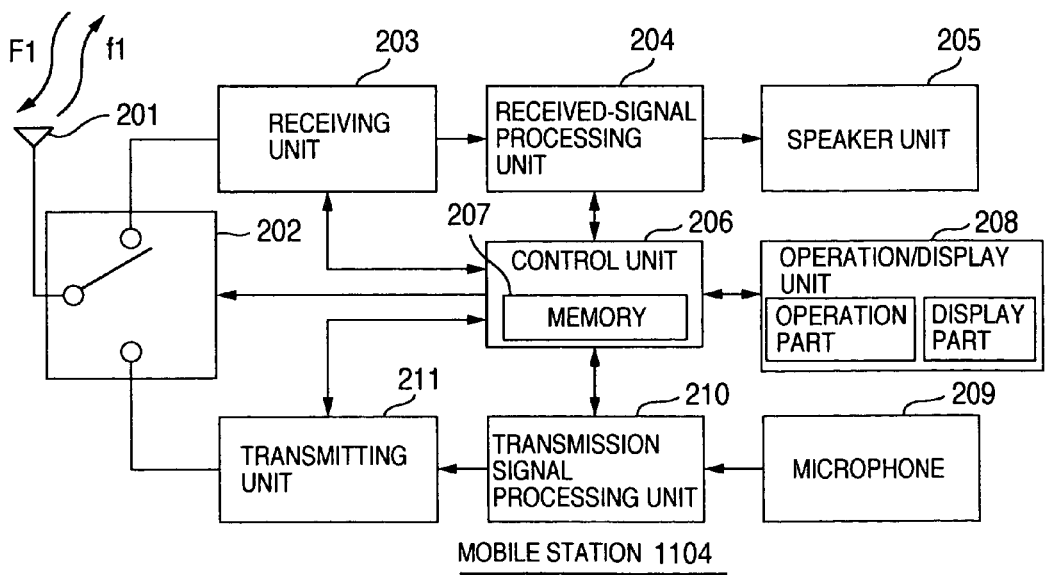

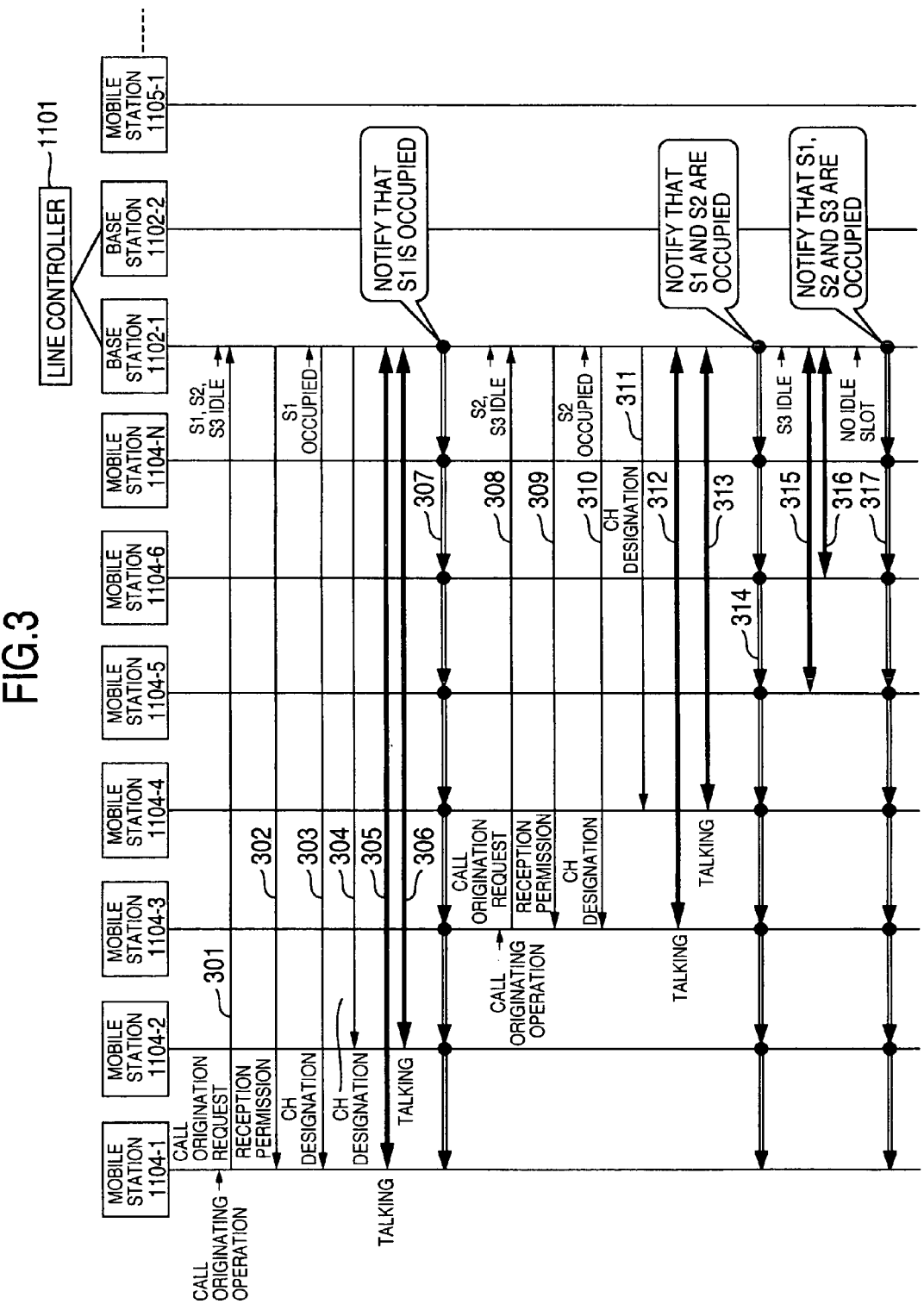

FIG.4
| R 6 | P 2 | CAC/E 112 | SW 20 | CI 2 | CC 6 | CAC/E 168 | I 4 |
R : GUARD TIME FOR BURST TRANSITIONAL RESPONSE
P : PREAMBLE
CAC : CONTROL SIGNAL (CONTAINING PCH, BCCH, SCCH)
PCH : BROADCAST CHANNEL
BCCH : INFORMATION CHANNEL
SCCH : SIGNALING CHANNEL FOR INDIVIDUAL ZONE
E : COLLISION CONTROL BIT
SW : SYNCHRONOUS WORD
CI : CARRIER INFORMATION
CC : COLOR CODE (INTERFERENCE MEASURE CODE)
I : IDLE BIT
FIG.5
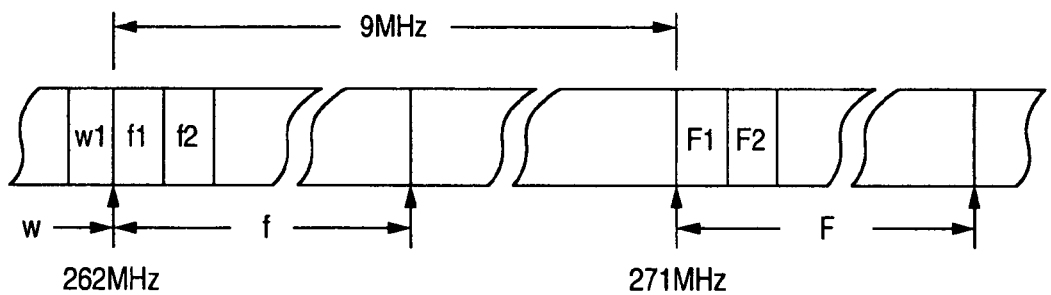
FIG.6
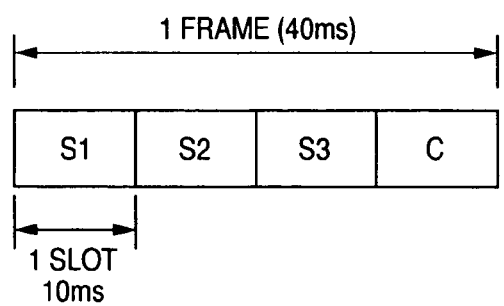

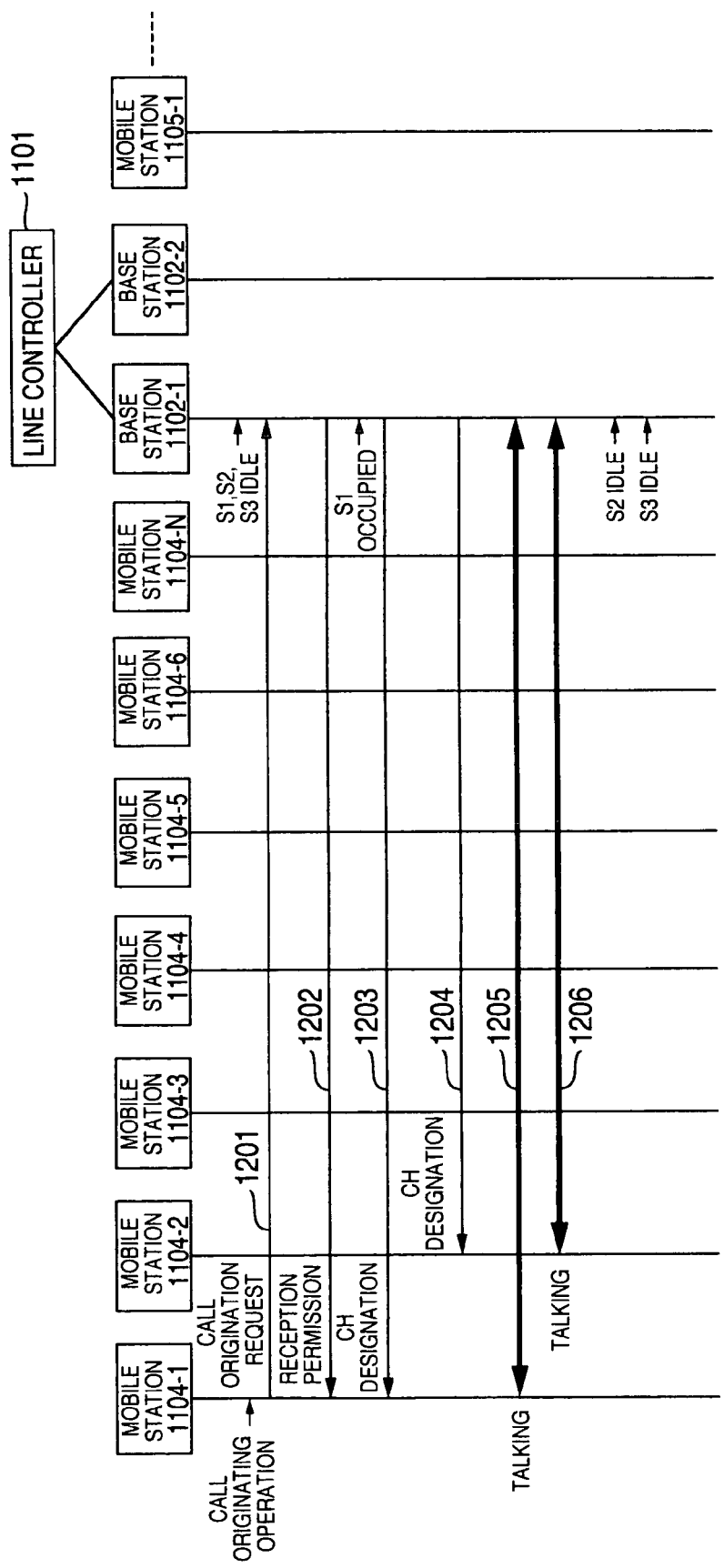

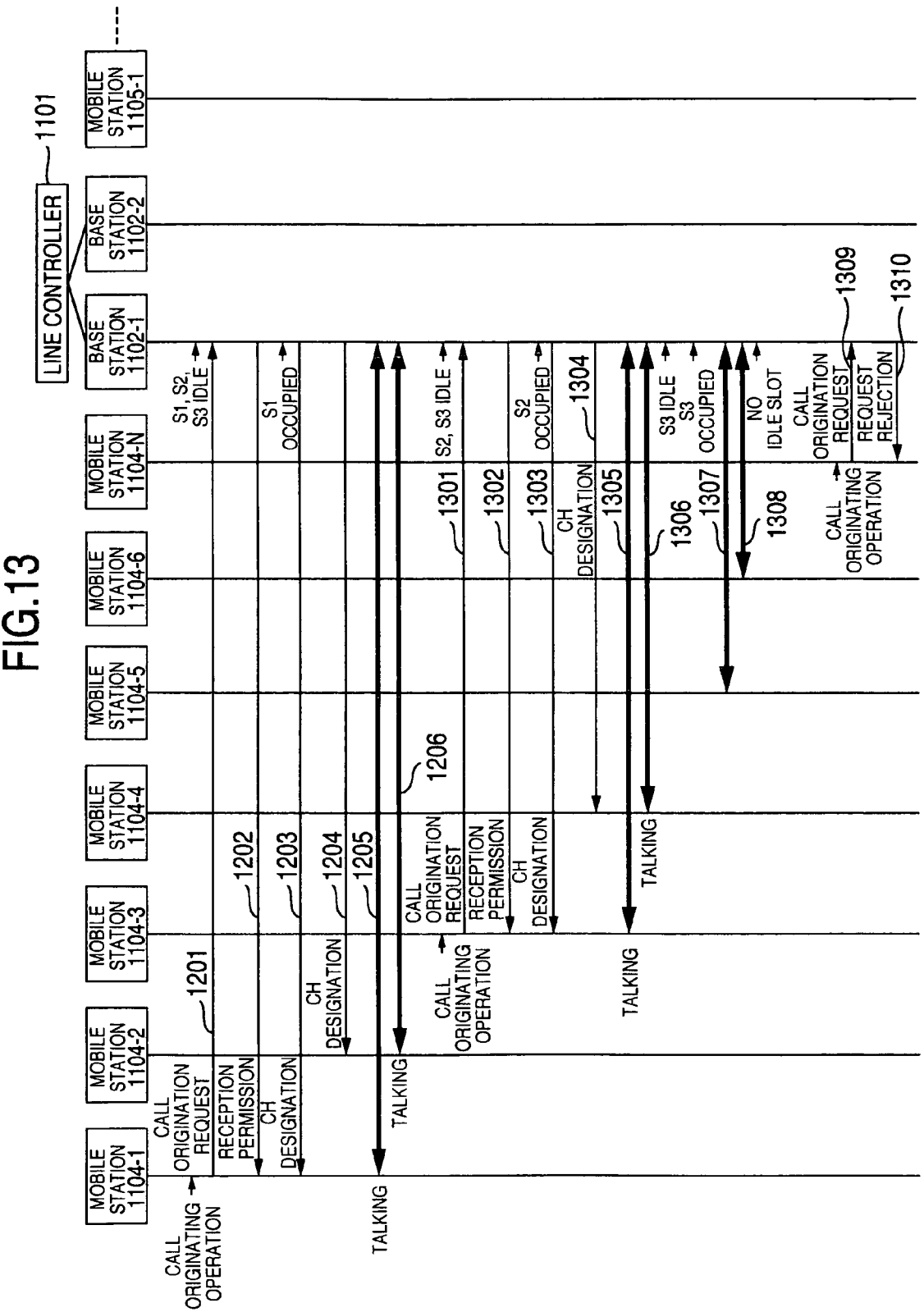

SLOT SITUATION TABLE

| INFORMATION NUMBER (Info.No.) | BASE STATION NUMBER | SLOT S1 | SLOT S2 | SLOT S3 |
|---|---|---|---|---|
| 1 | 1102-1 | NOT IDLE | NOT IDLE | NOT IDLE |
| 2 | 1102-2 | IDLE | NOT IDLE | NOT IDLE |
| 3 | 1102-3 | IDLE | IDLE | NOT IDLE |

RADIO COMMUNICATION SYSTEM

INCORPORATION BY REFERENCE

The present application claims priority from Japanese application JP2005-277262 filed on Sep. 26, 2005, the content of which is hereby incorporated by reference into this application.

BACKGROUND OF THE INVENTION

The present invention relates to a radio communication system and more particularly to a radio communication method and apparatus for carrying out a channel notification in a digital mobile communication system.

As one of the digital radio communication systems being put to practical use currently, a mobile communication system is defined in "REGIONAL DIGITAL MOBILE TELECOMMUNICATION SYSTEM", ARIB STD-T79, Ver. 1, Association of Radio Industries and Businesses, Jun. 6, 2001, pp. 1-24. FIG. 11 illustrates a general mobile communication system having a plurality of base station zones. In FIG. 11, numeral 1101 denotes a line controller, 1102-1 and 1102-2 base stations and 103-1 and 1103-2 base station zones, that is, communication areas of the respective base stations. The mobile communication system is so configured that the base station 1102-1 makes communication connection service with a plurality of mobile stations 1104-1, 1104-2, ..., 1104-N residing in the communication area 1103-1 between the base stations or between the mobile stations via base station or directly between the mobile stations or makes communication connection service between a mobile station outside the communication area 1103-1 and another mobile station within the communication area 1103-1.

The mobile communication system is also so configured that the base station 1102-2 makes communication connection service with a plurality of mobile stations 1105-1, 1105-2, ..., 1105-M residing in the communication area 1103-2 between the base stations or between the mobile stations via base station or directly between the mobile stations or makes communication connection service between a mobile station outside the communication area 1103-2 and another mobile station within the communication area 1103-2. The mobile stations are named generically as the mobile station 1104 or 1105.

The line controller 1101 makes communication connection between the base stations and the plurality of mobile stations, maintenance and management of the service area in the digital radio communication system and controls an originating call from a mobile station or setting of communication routes. The line controller 1101 may be installed integrally with the base station 1102-1 or 1102-2 or separately from the base stations as shown in FIG. 11. In the latter case, the line controller 1101 is generally connected to the base stations 1102-1 and 1102-2 via transmission paths 1106-1 and 1106-2 such as cable or microwave communication lines. Further, the mobile stations described here contain radios or radio transmitter-receivers mounted in vehicles, portable radios and information terminal stations. In this example, only two base stations are shown, although in general the system includes a plurality of base stations and a large number of mobile stations but description is made with reference to FIG. 11 showing the most simple configuration for convenience of description.

FIG. 5 shows an example of assignment of frequencies for radio carriers permitted to be used in the digital mobile communication system using the digital radio technique defined in the standard ARIB STD-T79. In FIG. 5, in the uplink direction, that is, in the direction of transmission from the mobile station to the base station, 112 waves (f1, f2, ...) having a bandwidth of 25 KHz have been authorized for radio carriers f of about 262 to 266 MHz. Further, in the downlink direction, that is, in the direction of transmission from the base station to the mobile station, 112 waves (F1, F2, ...) having a bandwidth of 25 KHz have been authorized for radio carriers F of about 271 to 275 MHz separated by 9 MHz from 262 MHz in the uplink direction. Accordingly, the frequencies f1, f2, ... and F1, F2, ... can be used in the uplink and downlink directions, respectively, in communication of the digital radio communication system. The systems can use one or a plurality of radio carriers in accordance with the respective system scale. Further, in the standard ARIB STD-T79, a radio carrier W has been authorized so that a mobile station 1104 positioned within the communication area 1103 can make direct communication with a mobile station 1104 positioned outside of the communication area 1103. The radio carrier W also has a bandwidth of 25 KHz and over ten waves (W1, W2, ...) have been authorized. In the radio communication system shown in FIG. 11, for example, the base station 1102-1 makes communication using pair waves of f1 in the uplink direction and F1 in the downlink direction and the base station 1102-2 also makes communication using pair waves of f3 in the uplink direction and F3 in the downlink direction.

Further, each radio carrier is divided into frames as shown in FIG. 6 and each frame is further divided into four slots, to which a control channel C and communication channels S1, S2 and S3 are assigned. The communication channels S1, S2 and S3 are named collectively as communication channel S. One frame is 40 ms, for example. The control channel C is used to make connection control of radio communication line and the communication channel S is used to make talking and data communication.

JP-A-5-191856 discloses a method in which a number-of-calls counter for counting the number of originating calls and the number of calls that cannot attain connection due to the fact that communication channel is busy is provided in the radio base station and the numbers are broadcast to portable terminals (radio terminals) at all times or when connection cannot be attained in origination of call by each portable terminal.

JP-A-2005-136779 discloses a mobile communication system including a plurality of base stations. The system includes retrieval means for retrieving idle channel for each base station periodically to obtain idle channel information, information sharing means for notifying the idle channel information to other base stations to share the idle channel information with each other, and idle channel information notification means for notifying the idle channel information of other base stations to mobile terminals on the basis of the shared idle channel information.

Reference may be further made to JP-A-2003-250176 and JP-A-6-303662.

SUMMARY OF THE INVENTION

Referring now to an operation sequence shown in FIG. 12, operation of the radio communication system shown in FIG. 11 is described. FIG. 12 shows the operation sequence in case where there are idle slot in the communication channel. The base station transmits an idle signal to the mobile stations periodically to make the base station and the mobile stations be in the synchronized state. The same thing applies even to the following operation sequences. When the mobile station 1104-1 makes call originating operation in order to make talking with the mobile station 1104-2, a call origination request is transmitted from the mobile station 1104-1 to the base station 1102-1 (step 1201). When the base station 1102-1 receives the call origination request, the base station detects the idle situation of the communication channel S. When the base station detects an idle slot, the base station transmits a reception permitting signal to the mobile station 1104-1 using the control channel C (step 1202) and at the same time the base station designates an idle communication channel S, for example, an idle communication channel S1 (CH designation) to notify the designated communication channel to the mobile stations 1104-1 and 1104-2 (steps 1203 and 1204). Thus, the mobile stations 1104-1 and 1104-2 are set to the communication channel S1 to make talking (steps 1205 and 1206). In this state, the communication channels S2 and S3 are still idle and accordingly other mobile stations 1104 can make talking.

Referring now to FIG. 13, an example of the operation sequence in case where there is no idle slot in the communication channel is described. The like elements to those shown in FIG. 12 are designated by the like reference numerals. In FIG. 13, the operation sequence in steps 1201 to 1206 in which the mobile stations 1104-1 and 1104-2 use the communication channel S1 to make talking is the same as that of FIG. 12. Subsequently, when the mobile station 1104-3 makes call originating operation in order to make talking with the mobile station 1104-4, an call origination request is transmitted from the mobile station 1104-3 to the base station 1102-1 (step 1301). When the base station 1102-1 receives the call origination request, the base station detects the idle situation of the communication channel S. When there are idle slots (communication channels S2 and S3 are idle), the base station transmits a reception permitting signal to the mobile station 1104-3 using the control channel C (step 1302) and at the same time the base station designates an idle communication channel S, for example, an idle communication channel S2 (CH designation) to notify the designated communication channel to the mobile stations 1104-3 and 1104-4 (steps 1303 and 1304). Thus, the mobile stations 1104-3 and 1104-4 are set to the communication channel S2 to make talking (steps 1305 and 1306).

Further, when the mobile station 1104-5 makes call originating operation in order to communicate with the mobile station 1104-6, the mobile stations 1104-5 and 1104-6 are set to the communication channel S3 to make talking (steps 1307 and 1308) by the same processing procedures as described above (detailed description is omitted) since the slot S3 is idle in the same manner as above.

Furthermore, when the mobile station 1104-N makes call originating operation in order to make talking with the mobile station 1104-7, for example, a call origination request is transmitted from the mobile station 1104-N to the base station 1102-1 (step 1309). When the base station 1102-1 receives the call origination request, the base station starts the operation for detecting the idle situation of the communication channel S. However, in the radio communication system, three slots S1, S2 and S3 in the communication channel S are set as shown in FIG. 6 and the three slots are already used. Accordingly, since the communication channel S cannot be permitted to the mobile station 1104-N any more, the base station 1102-1 transmits a request rejecting signal for connection to the mobile station 1104-N (step 1310).

In the foregoing description, communication between the base station 1102-1 and the mobile stations 1104 within the communication area 1103-1 of the base station 1102-1 has been described, although the communication between the base station 1102-2 and the mobile stations 1105 within the communication area 1103-2 of the base station 1102-2 is also made similarly.

In the radio communication system described above, when the mobile station operating in the base station transmits the call origination request signal to the base station, the base station detects the idle slot situation in the communication channel in response to the call origination request signal and when there is an idle slot, the base station transmits the reception permitting signal to the mobile station. When there is no idle slot, the base station transmits the call origination request rejecting signal to the mobile station. Accordingly, in the conventional radio communication system, in order that the mobile station makes communication, the mobile station first makes call originating operation and the base station then makes detection operation as to whether there is any idle slot in the communication channel or not and returns a response. Hence, the mobile station cannot make judgment as to whether the mobile station can make communication with another mobile station or not until the response from the base station is received. Accordingly, it is inconvenient for the mobile station in case of emergency and the reliability is possibly deteriorated. The realization of the radio communication system in which the above defects are improved is desired.

As described above, in the radio communication system, in order that the mobile station make communication, the mobile station first makes call originating operation and the base station then makes detection operation as to whether there is any idle slot in the communication channel or not and returns a response. Hence, the mobile station cannot make judgment as to whether the mobile station can make communication with another mobile station or not until the response from the base station is received. Accordingly, it is inconvenient for the mobile station in case of emergency and the reliability is possibly deteriorated. The realization of the radio communication system in which the above defects are improved is desired.

Further, when there is no idle slot in the base station to which the mobile station originating a call is registered, it is desirable that the mobile station can originate a call from the base station having an idle slot automatically or manually.

It is an object of the present invention to provide a radio communication system having high reliability and contributing to improvement of communication service or expansion of communication area.

It is another object of the present invention to provide a radio communication system which can grasp whether an idle channel is present or not.

It is still another object of the present invention to provide a radio communication system which can switch the communication area in which communication can be made.

According to an aspect of the present invention, the radio communication system comprises a line controller, a plurality of base stations connected to the line controller and a plurality of mobile stations connected to each of the plurality of base stations by radio communication line having control channel and communication channel. Each of the plurality of base stations includes a first control unit for monitoring whether there is any idle slot or not in a plurality of slots of the communication channel of the base station, and the first control unit transmits first resultant monitored information containing information as to whether there is any idle slot or not in the communication channel of the base station to the plurality of mobile stations within a communication area of the base station at first predetermined intervals by means of the control channel.

In the radio communication system, preferably, the first control unit of the base station acquires information as to whether there is any idle slot or not in the communication channel of other base stations and transmits it to the plurality of mobile stations within the communication area of the base station by means of the control channel.

In the radio communication system, preferably, the line controller includes a second control unit for monitoring whether there is any idle slot or not in a plurality of slots of the communication channel for each of the plurality of base stations to produce second resultant monitored information and an interface for transmitting the second resultant monitored information to each of the plurality of base stations.

Preferably, the line controller transmits the second resultant monitored information to each of the plurality of base stations at second predetermined intervals. Alternatively, the line controller transmits the second resultant monitored information to each of the plurality of base stations when the second resultant monitored information is changed.

Preferably, the first control unit of each base station monitors an occupancy situation of slots in the communication channel of the base station to produce the first resultant monitored information.

Preferably, each of the plurality of mobile stations includes a display unit for displaying information as to whether there is any idle slot or not in the communication channel of the base station and other base stations.

Preferably, each of the plurality of mobile stations includes an operation unit for permitting an operator of the mobile station to manually select any base station having idle slot on the basis of the displayed information as to whether there is any idle slot or not in the communication channel of the base station and other base stations.

Preferably, each of the plurality of mobile stations includes a third control unit for providing information as to whether there is any idle slot or not in the communication channel of the base station and other base stations and when the mobile station which is registered in the base station having no idle slot originates a call, the mobile station is automatically registered in another base station having idle slot on the basis of the information as to whether there is any idle slot or not in the communication channel of other base stations.

Preferably, the information as to whether there is any idle slot or not in the communication channel of other base stations is transmitted to the plurality of mobile stations within the communication area of the base station at third predetermined intervals.

According to another aspect of the present invention, a radio communication method in a radio communication system including a line controller, a plurality of base stations connected to the line controller and a plurality of mobile stations connected to each of the plurality of base stations by radio communication line having control channel and communication channel, comprises the steps of monitoring by each of the plurality of base stations whether there is any idle slot or not in a plurality of slots of the communication channel of the base station to produce first resultant monitored information and transmitting by the base station the first resultant monitored information to the plurality of mobile stations within a communication area of the base station at first predetermined intervals by means of the control channel.

In the radio communication method, preferably, the line controller monitors whether there is any idle slot or not in a plurality of slots of the communication channel of each of the plurality of base stations to produce second resultant monitored information and transmits the second resultant monitored information to each of the plurality of base stations at second predetermined intervals or when the second resultant monitored information is changed, and each of the plurality of base stations transmits the received second resultant monitored information to the plurality of mobile stations of the base station at third predetermined intervals.

Preferably, each of the plurality of mobile stations of each base station receives the first and second resultant monitored information and each of the plurality of mobile stations displays information as to whether there is any idle slot or not in the communication channel of the base station and other base stations in a display unit of the mobile station and permits an operator of the mobile station to manually select any base station having idle slot on the basis of the displayed information as to whether there is any idle slot or not.

Preferably, each of the plurality of mobile stations of each base station receives the first and second resultant monitored information and when the mobile station which is registered in the base station having no idle slot originates a call, the mobile station is automatically registered in another base station having idle slot on the basis of the second resultant monitored information.

According to still another aspect of the present invention, a line controller in a radio communication system including the line controller, a plurality of base stations connected to the line controller and a plurality of mobile stations connected to each of the plurality of base stations by radio communication line having control channel and communication channel, comprises a control unit for monitoring whether there is any idle slot or not in a plurality of slots of the communication channel of each base station, a memory for storing the information as to whether there is any idle slot or not in the communication channel and an interface for connection with the plurality of base stations, and the information as to whether there is any idle slot or not in the communication channel of each base station is transmitted to relevant base station or the plurality of base stations.

In the line controller, preferably, the information as to whether there is any idle slot or not in the communication channel is transmitted to the relevant base station or the plurality of base stations at predetermined intervals or when the information is changed.

Other objects, features and advantages of the invention will become apparent from the following description of the embodiments of the invention taken in conjunction with the accompanying drawings.

BRIEF DESCRIPTION OF THE DRAWINGS

FIGS. 1A and 1B are block diagrams schematically illustrating a base station and a line controller according to an embodiment of the present invention, respectively;

FIG. 2 is a block diagram schematically illustrating a mobile station according to an embodiment of the present invention;

FIG. 3 is a diagram showing an operation sequence for explaining operation of the present invention;

FIG. 4 is a diagram showing a format of a control channel used in the present invention;

FIG. 5 is a diagram for explaining the relation of frequencies for radio carriers used in the present invention;

FIG. 6 is a diagram for explaining a format of a frame used in the present invention;

FIG. 12 is a diagram showing an operation sequence for explaining an operation example of the radio communication system shown in FIG. 11;

FIG. 13 is a diagram showing an operation sequence for explaining another operation example of the radio communication system shown in FIG. 11;

DESCRIPTION OF THE EMBODIMENTS

Figure 7:
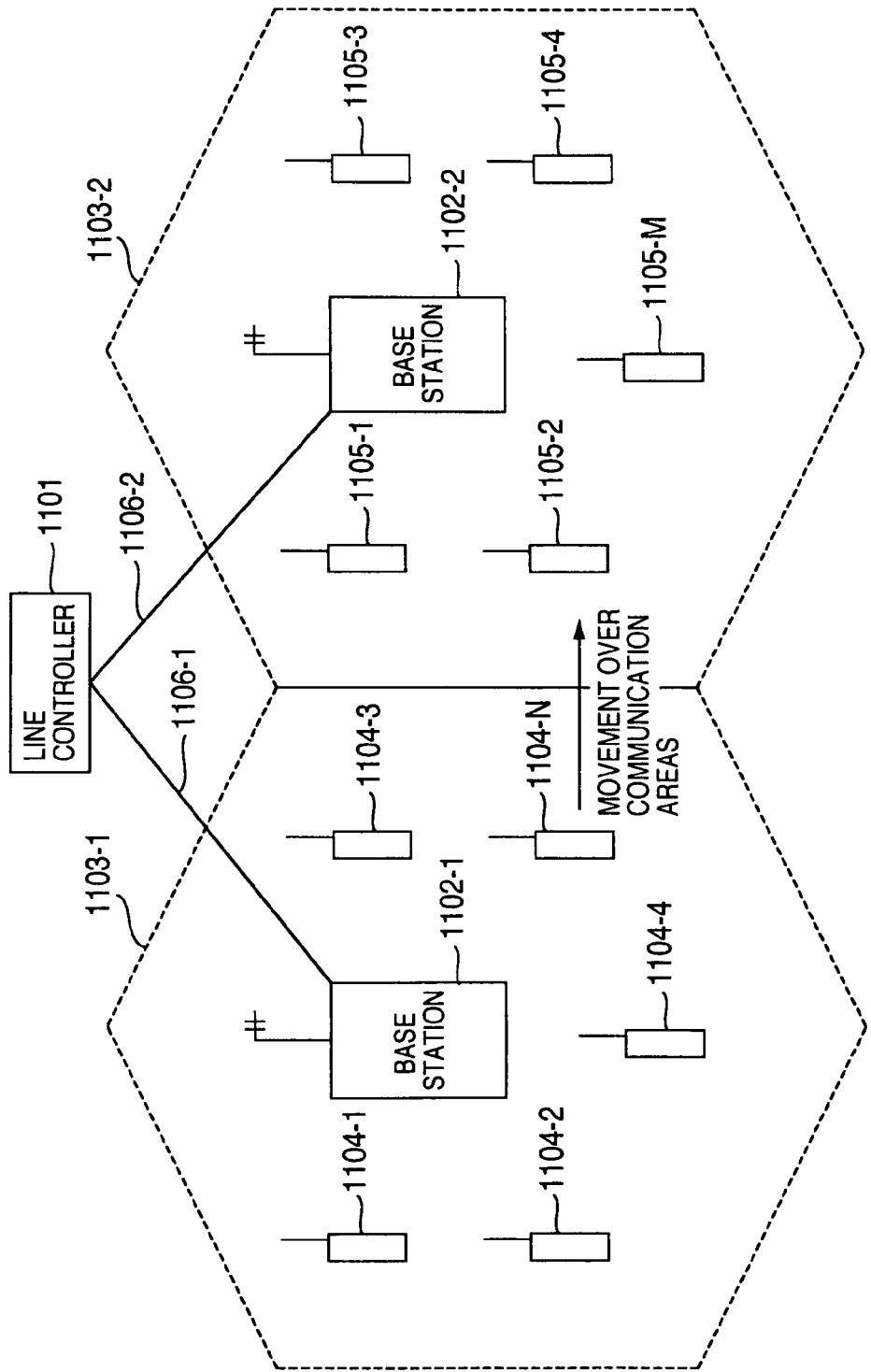
FIG. 7 is a schematic diagram illustrating another embodiment of the present invention;.

Embodiments of the present invention are now described with reference to the accompanying drawings. The like reference numerals are given to the like elements throughout the whole drawings.

Figure 11:
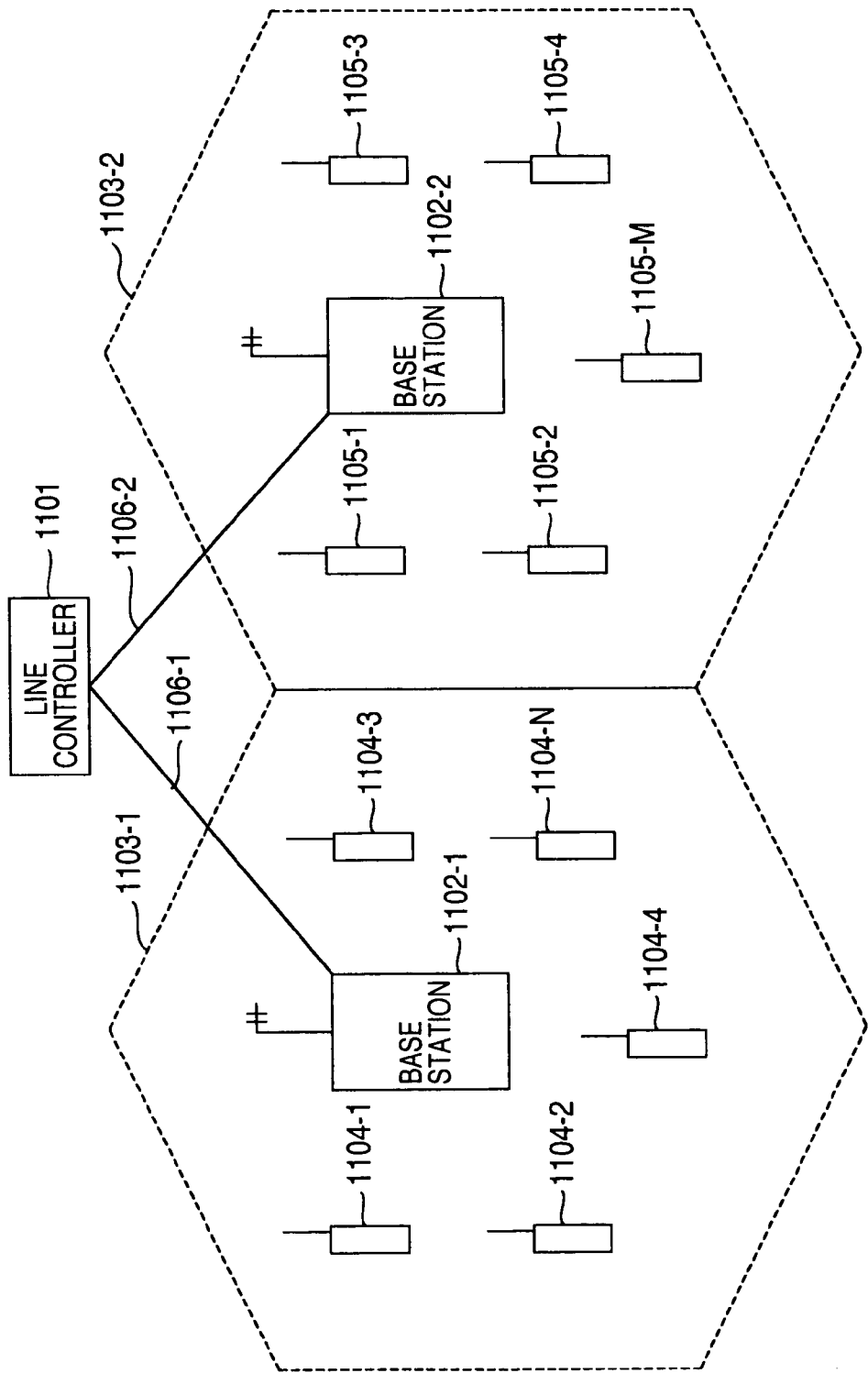
FIG. 11 is a diagram for explaining an example of a general radio communication system.

An embodiment of the present invention is now described with reference to FIGS. 1A, 1B, 2 and 3. The radio communication system described in the embodiment is the same as that of FIG. 11 and accordingly detailed description thereof is omitted. FIGS. 1A and 1B are block diagrams schematically illustrating an embodiment of a line controller 1101 and a base station 1102. FIG. 1A illustrates the base station 1102, which includes a radio apparatus 101 and a control apparatus 102. The radio apparatus 101 includes a transmission unit 103 for transmitting a signal from the base station 1102 to the mobile station 1104 by a radio carrier F1, for example, and a reception unit 104 for receiving a signal from the mobile station 1104 by a radio carrier f1, for example. The controller 102 includes a control unit 105, a memory 106 and an interface 108 for connection with other devices. FIG. 1B illustrates the line controller 1101, which includes a control unit 109, a memory 110 and an interface 111 for connection with other devices. Further, the base stations 1102-1 and 1102-2 have the same configuration and accordingly description is made as the base station 1102.

FIG. 2 is a block diagram schematically illustrating the mobile station 1104. The mobile station 1104 is shown in FIG. 2, while the mobile station 1105 has the same configuration and accordingly description is made using the mobile station 1104. The mobile station 1104 shown in FIG. 2 shows a radio communication apparatus using the pair waves of the radio carrier f1 in the uplink direction and the radio carrier F1 in the downlink direction and capable of making simultaneous transmission and reception. In FIG. 2, numeral 201 denotes an antenna for making transmission and reception to the base station 1102, 202 a high-speed switch for making simultaneous transmission and reception, 203 a receiving unit, 204 a received-signal processing unit including a demodulator, 205 a speaker unit, 206 a control unit, 207 a memory, 208 an operation/display unit, 209 a microphone, 210 a transmission signal processing unit, and 211 a transmitting unit including a modulator. The operation/display unit 208 includes an operation part and a display part.

Operation of the present invention is now described on the basis of the operation sequence shown in FIG. 3. Reference numerals in FIG. 3 correspond to those shown in FIG. 11. In FIG. 3, when the mobile station 1104-1 makes call originating operation in order to make talking with the mobile station 1104-2, a call origination request is transmitted from the mobile station 1104-1 to the base station 1102-1 (step 301). When the base station 1102-1 receives the call origination request, the base station detects the idle situation of the communication channel S. When there is an idle slot, the base station transmits a reception permitting signal to the mobile station 1104-1 using the control channel C (step 302) and at the same time the base station designates an idle communication channel S, for example, an idle communication channel S1 to notify the designated communication channel to the mobile stations 1104-1 and 1104-2 (steps 303 and 304). Thus, the mobile stations 1104-1 and 1104-2 are set to the communication channel S1 to make talking (steps 305 and 306). In this state, the communication channels S2 and S3 are still idle and accordingly other mobile stations 1104 can make talking.

In the present invention, the base station 1102-1 notifies the idle communication channel to each mobile station 1104 in this state. This operation is described in further detail. FIG. 4 shows a format of the control channel transmitted by the radio carrier F1 in the downlink direction defined in the standard ARIB STD-T79, that is, in the direction of transmission from the base station 1102 to the mobile station 1104. In FIG. 4, R represents a guard time for burst transitional response, P a preamble, CAC a control signal (containing PCH, BCCH, SCCH), PCH a broadcast channel, BCCH an information channel, SCCH a signaling channel for individual zone, E a collision control bit, SW a synchronous word, CI carrier information, CC a color code (interference measure code), and I an idle bit. In FIG. 4, numerical values represent the number of bits and the control channel includes 320 bits in total.

The control unit 105 of the base station 1102, for example, the base station 1102-1 always grasps the talking state in the radio communication system within its own communication area 1103-1 and also grasps the idle state of the communication channel S, so that the control unit 105 stores the grasped resultant monitored information into the memory 106 as a communication channel idle slot situation table as shown in Table 1. Needless to say, the memory format is not limited to the table format. It may be any format as far as it is understood whether respective slots are idle or not. The idle slot situation in the communication channel can be grasped by monitoring the communication channel by the base station. That is, the base station always monitors whether there is any idle slot or not in response to the call origination request from the mobile station and accordingly the base station can always grasp the idle slot situation in the communication channel. Further, since the line controller also monitors the idle slot situation in the communication channel in each base station, the base station can produce the idle slot situation in the communication channel in the base station itself and other base stations if necessary on the basis of the resultant monitored information transmitted from the line controller.

TABLE 1

| Base Station 1102-1 | |
|---|---|
| Slot Number | Slot is Idle or Not |
| S1 | Not |
| S2 | Idle |
| S3 | Idle |

Table 1 is a communication channel idle slot situation table showing the idle situation of the communication channels S1, S2 and S3 of one frame shown in FIG. 6. This table is monitored by the control unit 105 and is always updated in response to the talking state in the radio communication system. In Table 1, slots S2 and S3 are idle. The control unit 105 makes reference to the communication channel idle slot situation table at predetermined intervals, for example, at intervals of several tens to several hundreds milliseconds and transmits the contents thereof to all the mobile stations 1104 using the control signal CAC of the downlink direction control channel shown in FIG. 4 (step 307).

Each mobile station 1104 which has received the control signal grasps the idle state of the slots indicated by the slot numbers S1, S2 and S3 by the received-signal processing unit 204 and stores the idle state in the memory 207. In order that an operator makes talking, the operator operates the operation/display unit 208 to read out the idle slot state from the memory 207, so that the idle slot state can be displayed in the operation/display unit 208. In step 307 of FIG. 3, since the communication channel S1 is occupied, the communication channels S2 and S3 are displayed in the operation/display unit 208 as idle slots. Further, since the mobile stations 1104-1 and 1104-2 are in the talking state at this time, this information is not received by them.

Then, when the mobile station 1104-3 is to make talking with the mobile station 1104-4, the base station 1102-1 notifies in advance to each mobile station 1104 that the slots S2 and S3 are idle in step 307 as described above and accordingly the operator can understand easily that the mobile station 1104-3 can make talking at this time. Therefore, when the mobile station 1104-3 makes call originating operation, a call origination request is transmitted from the mobile station 1104-3 to the base station 1102-1 (step 308). The base station 1102-1 which has received the call origination request transmits a reception permitting signal to the mobile station 1104-3 using the control channel C since the communication channels S2 and S3 have idle slots at this time (step 309) and at the same time the base station 1102-1 designates the idle communication channel S2 (CH designation) to notify the designated communication channel S2 to the mobile stations 1104-3 and 1104-4 (steps 310 and 311). Thus, the mobile stations 1104-3 and 1104-4 are set to the communication channel S2 to make talking (steps 312 and 313). The control unit 105 makes reference to the updated communication channel idle slot situation table to transmit the idle slot situation to all the mobile stations 1104 (step 314) in the same manner as described above.

Similarly, when the mobile station 1104-5 is to make communication with the mobile station 1104-6, the same steps as described above (detailed description thereof is omitted) are executed, so that the mobile stations 1104-5 and 1104-6 are set to the idle communication channel S3 to make talking (steps 315 and 316).

The control unit 105 of the base station 1102-1 monitors the communication channel slots and accordingly when the communication channel S3 is used, the control unit updates the communication channel idle slot situation table stored in the memory 106 of the base station as shown in Table 2.

TABLE 2

Base Station 1102-1

| Slot Number | Slot is Idle or Not |
| --- | --- |
| S1 | Not |
| S2 | Not |
| S3 | Not |

Table 2 shows the state where the slots S1, S2 and S3 are not idle. Accordingly, the control unit 105 of the base station 1102-1 makes reference to the communication channel idle slot situation table stored in the memory 106 to transmit to all the mobile stations 1104 that the slots S1, S2 and S3 are occupied, using the control signal CAC of the down control channel shown in FIG. 4 (step 317). Consequently, the mobile stations 1104 which do not make talking currently understand that there is no idle slot in the base station 1102-1. Accordingly, since the mobile stations can understand the talking state in the current system without requiring the operation that the mobile station makes call originating operation and receives a request rejecting signal from the base station 1102-1 as shown in FIG. 13, the extremely convenient radio communication system can be realized.

The line controller 1101 manages the base stations 1102-1 and 1102-2 collectively. In other words, the control unit 109 of the line controller monitors the idle slot situation in the communication channel for each base station and produces information as to whether there is any idle slot or not in each base station as the resultant monitored information to be stored in the memory 110 of the line controller 1101 as a table representing the idle slot situation in each base station 1102 as shown in Table 3.

TABLE 3

| Base Station Number | Slot S1 | Slot S2 | Slot S3 |
| --- | --- | --- | --- |
| 1102-1 | Not Idle | Not Idle | Not Idle |
| 1102-2 | Not Idle | Idle | Idle |

Accordingly, each base station 1102 can get the idle slot situation of other base stations from the line controller and notify the idle slot situation to the mobile stations within its own communication area if necessary. An example for notifying the idle slot situation to the mobile stations is now described.

Figure 14A:
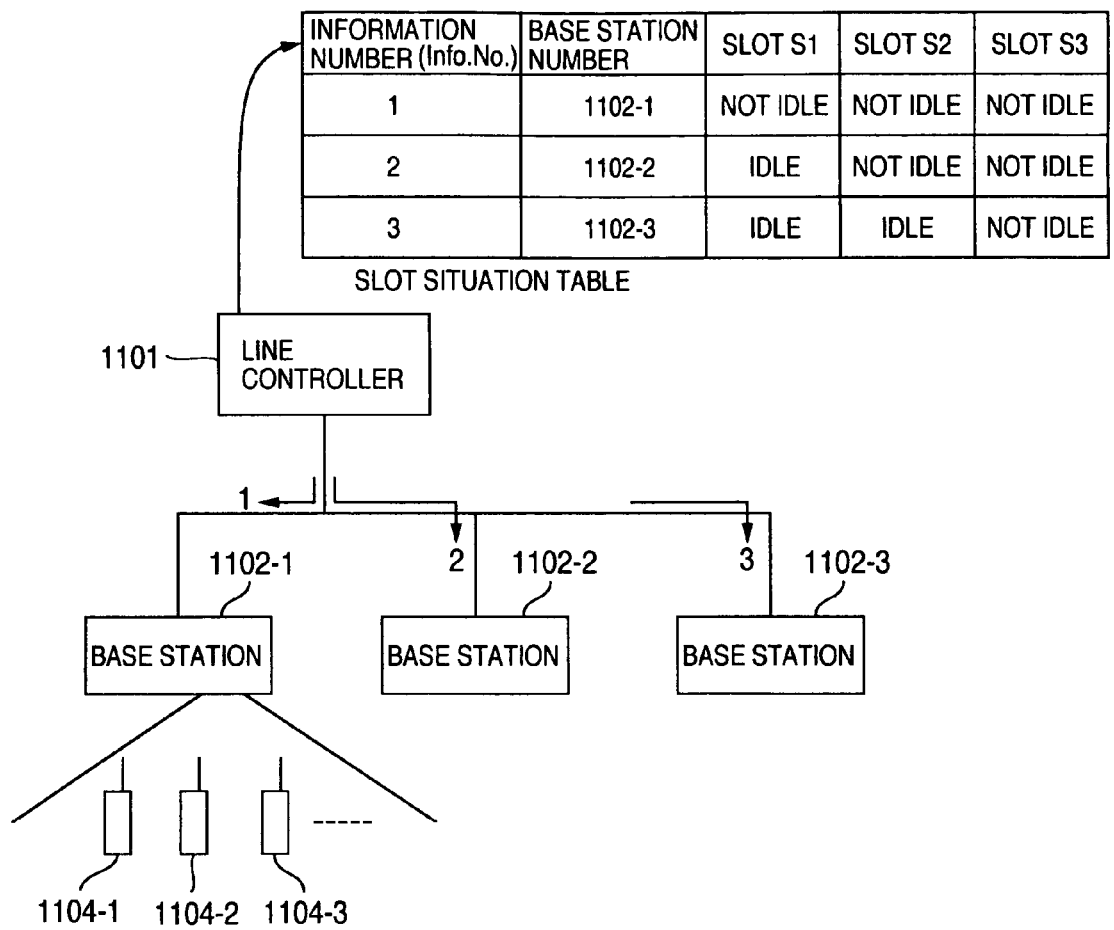
FIGS. 14A and 14B are diagrams for explaining operation of the line controller.
Figure 14B:
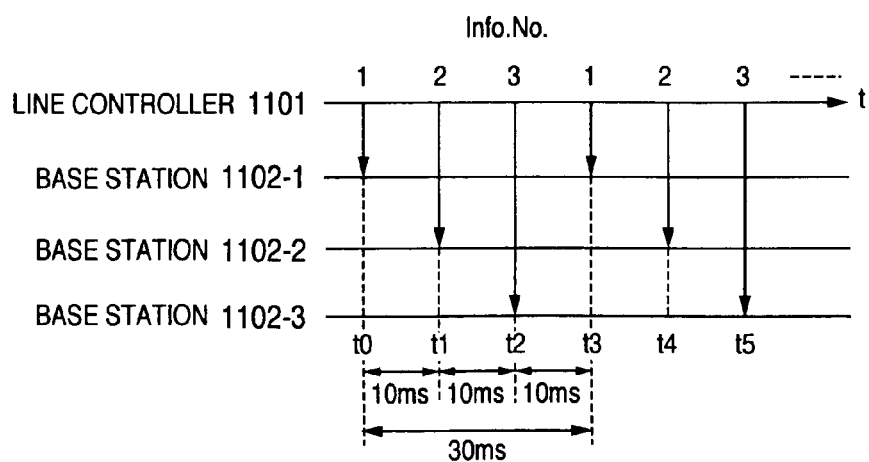

Referring first to FIGS. 14A and 14b, operation for transmitting the idle slot situation as shown in Table 3 from the line controller 1101 to the base stations is described. For simplification of description, as shown in FIG. 14A, it is supposed that three base stations 1102-1, 1102-2 and 1102-3 are connected to the line controller 1101. In FIG. 14A, it is also supposed that the idle slot information shown in the slot situation table of FIG. 14A is stored in the line controller 1101. In the example of the table, the slots S1, S2 and S3 of the base station 1102-1 are all occupied (busy) and its situation is shown as the information number 1. Similarly, the idle situation of the slots S1, S2 and S3 in the base stations 1102-2 and 1102-3 is shown as the information numbers 2 and 3. Further, in FIG. 14A, it is supposed that the mobile stations 1104-1, 1104-2, 1104-3 ... are positioned within the communication area of the base station 1102-1. Similarly, a plurality of mobile stations are also positioned within the communication areas of the other base stations 1102-2 and 1102-3, although not shown.

FIG. 14B shows an example of the operation for transmitting the idle slot information from the line controller 1101 to each base station. In FIG. 14B, the line controller 1101 transmits the contents of the information numbers 1, 2 and 3 to the base station 1102-1, 1102-2 and 1102-3 at intervals of 10 milliseconds, respectively. Accordingly, the idle slot situation information of the base station 1102-1 is transmitted to the base station 1102-1 at intervals of 30 milliseconds (=10 milliseconds×3). When there are N base stations, the period is 10 milliseconds×N. The value of 10 milliseconds is a mere example and it may be decided properly in accordance with specifications or requirements of the radio communication system. Alternatively, only when the idle slot situation is changed, the changed idle slot situation may be transmitted to the related base stations instead of transmitting the idle slot situation information at predetermined intervals or the idle slot situation information may be transmitted in response to a request from the base station or the mobile station.

Each base station transmits the received information of the monitored idle slots in its own communication channel to the mobile stations within its own communication area at predetermined intervals. The predetermined interval is several tens to several hundreds milliseconds as described above.

In the above example, only the idle slot situation information (information number 1, 2 or 3) of each base station is notified to each base station at predetermined intervals, although the idle slot situation information (information numbers 2 and 3) of other base stations (1102-2 and 1102-3) may be added to the idle slot situation information of the base station to be transmitted to each base station simultaneously or at another timing. Consequently, each base station can notify the idle slot situation information in other base stations except itself to all the mobile stations within its own communication area at predetermined intervals or at any timing. The operator of each mobile station can operate the operation/display unit 208 of each mobile station to display the idle slot situation information of the base station and/or other base stations into the display part, so that the operator can understand the idle slot situation information.

FIG. 7 is a schematic diagram illustrating another embodiment of the present invention. The reference numerals given to the elements of FIG. 7 are the same as those of FIG. 11. In the embodiment of FIG. 7, it is understood from the foregoing description made in the preceding embodiment that there is no idle slot in the communication channel S of the base station 1102-1 when a mobile station within the communication area 1103-1 of the base station 1102-1, for example, the mobile station 1104-N is to make talking with another mobile station, for example, the mobile station 1105-1 within the communication area 1103-2 of the base station 1102-2. On the other hand, as described above, the line controller 1101 understands that there are idle slots in the communication channel S of the base station 1102-2 as shown in Table 3. Accordingly, when the mobile station 1104-N moves from the communication area 1103-1 into the communication area 1103-2, the mobile station 1104-N can make talking with the mobile station 1105-1 within the communication area 1103-2 of the base station 1102-2 since there are idle slots in the communication channel S of the base station 1102-2.

Figure 8:
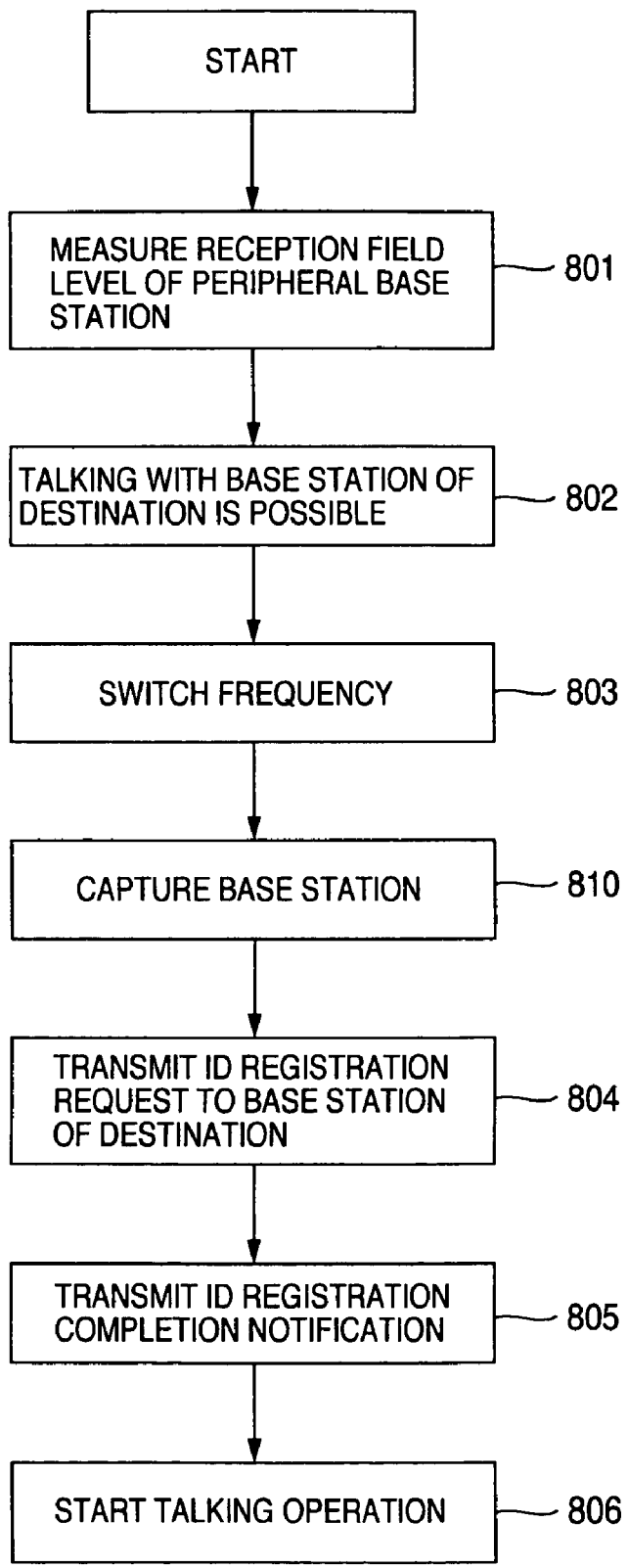
FIG. 8 is a flow chart showing operation of the embodiment shown in FIG. 7.

Operation of the embodiment of FIG. 7 is now described with reference to the flow chart of FIG. 8. In FIG. 8, first, the mobile station 1104-N starts to move from the communication area 1103-1 of the base station 1102-1 into the communication area 1103-2 of the base station 1102-2 and at the same time measures electric field level for reception of peripheral base station (step 801). Measurement of the reception field level of the peripheral base station can be made, for example, by monitoring a gain control voltage of a high-frequency amplifier (not shown) of the receiving unit 203 of the mobile station 1104-N by the control unit 206 and displaying it in the operation/display unit 208.

When the reception field level reaches a predetermined value or more (that is the level at which voice can be heard), the mobile station 1104-N can make talking with the base station 1103-2 (step 802) and accordingly the mobile station 1104-N switches the frequency (step 803). That is, the pair frequencies f1 and F1 for the communication area 1103-1 of the base station 1102-1 are switched to the pair frequencies f3 and F3 for the communication area 1103-2 of the base station 1102-2. The switching of the frequencies can be made by operating the operation/display unit 208 to control the control unit 206 so that an oscillation frequency of a frequency synthesizer is switched, for example. When the switching of the frequencies is completed, the processing proceeds to step 810. In step 810, the base station 1102-2 is captured. The capture processing is similar to that in step 1002 or 1002' of FIG. 10 and description thereof is omitted. When the capture of the base station is completed, the processing proceeds to step 804.

In step 804, the mobile station 1104-N transmits a registration request of ID, for example, of the mobile station 1104-N to the base station 1102-2 of destination. When the base station 1102-2 receives the ID registration request, the base station 1102-2 transmits registration completion notification to the mobile station 1104-N (step 805). In the registration of the mobile station to the base station, when there are a plurality of base stations, a registration table for mobile station in each base station is properly updated in response to movement of the mobile station. The method of registering the mobile station within the communication area is well known heretofore and accordingly detailed description thereof is omitted. Further, the registration processing of the mobile station is similar to registration reception 1007 and 1017 in FIG. 10. Thus, the mobile station 1104-N can make talking with the mobile station 1105-1 within the communication area 1103-2 of the base station 1102-2. Accordingly, the mobile station 1104-N starts talking operation (step 806). The operation sequence of talking is the same as that shown in FIG. 3 and detailed description thereof is omitted. As described above, when there is idle slot in the communication channel of other base stations even if there is no idle slot in the communication channel S of the base station, the mobile station can understand the idle slot in the communication channel of other base stations on the basis of the notification of the idle slot from each base station and accordingly the mobile station can move (roam) to the communication area of other base stations and can make talking with the mobile station positioned within the communication area of the other base stations.

Figure 9:
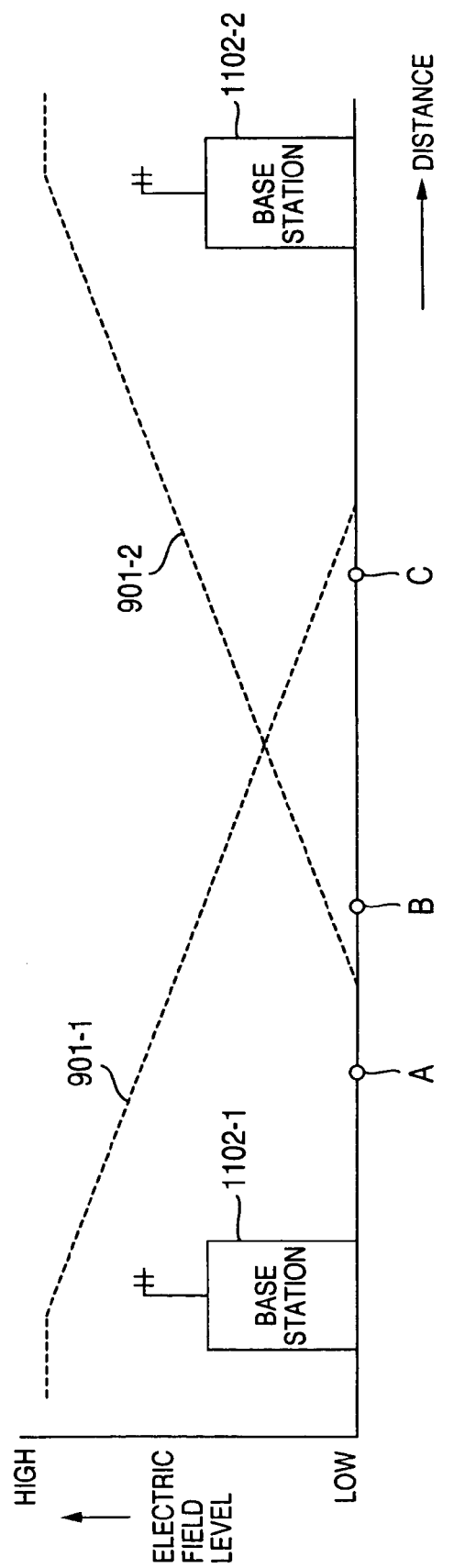
FIG. 9 is a diagram showing curves of the electric field strength for explaining still another embodiment of the present invention.

Still another embodiment of the present invention is now described with reference to FIGS. 9 and 10. FIG. 9 shows the distribution of electric field strength in the vicinity of the boundary of the communication area 1103-1 of the base station 1102-1 and the communication area 1103-2 of the base station 1102-2. In FIG. 9, the abscissa axis represents distance and the ordinate axis represents an electric field level. Numeral 901-1 represents a curve of the electric field strength in the communication area 1103-1 of the base station 1102-1 and 901-2 a curve of the electric field strength in the communication area 1103-2 of the base station 1102-2. The communication areas 1103-1 and 1103-2 partially overlap each other. In this state, for example, when the mobile station 1104-N is positioned at place A, the mobile station is positioned within the communication area 1103-1 of the base station 1102-1 and can make talking through the base station 1102-1. However, when the base station 1104-N is positioned at place B or C, the communication areas 1103-1 and 1103-2 overlap each other at the place B or C and accordingly the mobile station 1104-N can select any of the base stations 1102-1 and 1102-2 to make communication.

Operation in this case is now described with reference to the operation sequence of FIG. 10. First, when the mobile station 1104-N is positioned at place B, the power supply of the mobile station 1104-N is turned on (step 1001). When the power supply is turned on, the mobile station 1104-N captures electric waves of the base station 1102-1 of which the electric field strength at the place B is stronger (step 1002). At this time, the mobile station 1104-N operates the operation/display unit 208 so that the mobile station 1104-N requests the base station 1102-1 to register its own ID (step 1003). When the base station 1102-1 receives the registration request, the base station transmits the registration request to the line controller 1101 (step 1004). When the line controller 1101 receives the registration request, the line controller updates a mobile station information table stored in the memory 110 to register the mobile station 1104-N (step 1105) therein. An example of the mobile station information table is shown in Table 4.

TABLE 4

| Base Station Number | Mobile Station ID |
|---|---|
| 1102-1 | 1104-1 |
|  | 1104-2 |
|  | . |
|  | . |
|  | . |
|  | 1104-N |
| 1102-2 | 1105-1 |
|  | . |
|  | . |
|  | . |
|  | 1105-P |
| . | . |
| . | . |
| . | . |

In Table 4, the mobile stations 1104-1, 1104-2, . . . are registered in the base station 1102-1 before and the mobile station 1104-N is registered in this table thereafter. Further, the mobile stations 1105-1, . . . , 1105-P are registered in the base station 1102-2.

Next, the line controller 1101 transmits registration reception notification to the base station 1102-1 (step 1006). When the base station 1102-1 receives the registration reception notification, the base station transmits the registration reception notification to the mobile station 1104-N (step 1007). Thus, the mobile station 1104-N is placed under control of the base station 1102-1.

In step 1008, the electric field level for reception of peripheral base station is measured. That is, the mobile station 1104-N measures the reception field level of peripheral base station in the same manner as described above to judge whether the enough electric field strength to be able to make transmission and reception under control of the base station 1102-1 can be acquired or not and confirms that reception can be made normally.

In step 1009, the base station 1102-1 always monitors the idle slot in its own communication channel S as described in the preceding embodiment and notifies the idle slot information to the mobile stations 1104 placed under control of the base station as described with reference to FIG. 3 (step 1010). Accordingly, the mobile station 1104-N can also receives the information and confirm the idle slot situation in the communication channel S of the base station 1102-1 (step 1011).

Next, if it is grasped that there is no idle slot in the communication channel S of the base station 1102-1 already as shown in Table 2 when the mobile station 1104-N is to make communication with another mobile station, the mobile station 1104-N can get the idle slot situation in the communication channel S of peripheral base station from the line controller 1101 as shown in FIG. 3. For example, in Table 3, it is grasped that there are idle slots S2 and S3 in the base station 1102-2. Accordingly, the mobile station 1104-N switches the frequency (step 1012). In the switching of the frequency in step 1012, since the mobile station 1104-N is positioned at place B shown in FIG. 9, the operation/display unit 208 of the mobile station 1104-N is operated to control the control unit 206 so that the oscillation frequency of the frequency synthesizer is varied manually or the control unit 105 of the mobile station 1104-N varies the oscillation frequency of the frequency synthesizer automatically to make switching to the pair radio carriers f3 and F3 for the communication area 1103-2 of the base station 1102-2. Consequently, the mobile station 1104-N can make communication with the base station 1102-2. The operation sequence in case where the base station is changed over manually is described later with reference to FIG. 15. Then, in step 1002', the base station 1102-2 is captured. This operation is the same as that of step 1002, although it is made as follows.

The mobile station 1104-N transmits a registration request of ID thereof to the base station 1102-2 (step 1013). When the base station 1102-2 receives the registration request, the base station further transmits the registration request to the line controller 1101 (step 1014).

When the line controller 1101 receives the registration request, the line controller updates the mobile station information table shown in Table 4 stored in the memory 110 as shown in Table 5 and registers the mobile station 1104-N to be place under control of the base station 1102-2.

TABLE 5

| Base Station Number | Mobile Station ID |
|---|---|
| 1102-1 | 1104-1 |
|  | 1104-2 |
|  | . |
|  | . |
|  | . |
| 1102-2 | 1105-1 |
|  | 1104-N |
|  | . |
|  | . |
|  | . |
|  | 1105-P |
| . | . |
| . | . |
| . | . |

The line controller 1101 transmits the registration reception information to the base station 1102-2 (step 1016). When the base station 1102-2 receives the registration reception information, the base station transmits the registration reception information to the mobile station 1104-N,(step 1017). Consequently, the registration of the mobile station 1104-N placed under control of the base station 1102-1 is changed so that the mobile station is placed under control of the base station 1102-2 (step 1018). In step 1008', the electric field level for reception of peripheral base station is measured in the same manner as in step 1008. That is, the mobile station 1104-N measures the reception field level of peripheral base station in the same manner as described above to judge whether the enough electric field strength to be able to make transmission and reception under control of the base station 1102-2 can be acquired or not and confirms that reception can be made normally.

As described above, when the mobile station is positioned at place B or C where a plurality of communication areas overlap each other, an idle slot in the communication channel can be used to make communication only by changing the base station in which the mobile station is registered without movement of the mobile station and accordingly the radio communication system having the extremely high freedom degree and the spreadable communication area can be realized.

Figure 10:
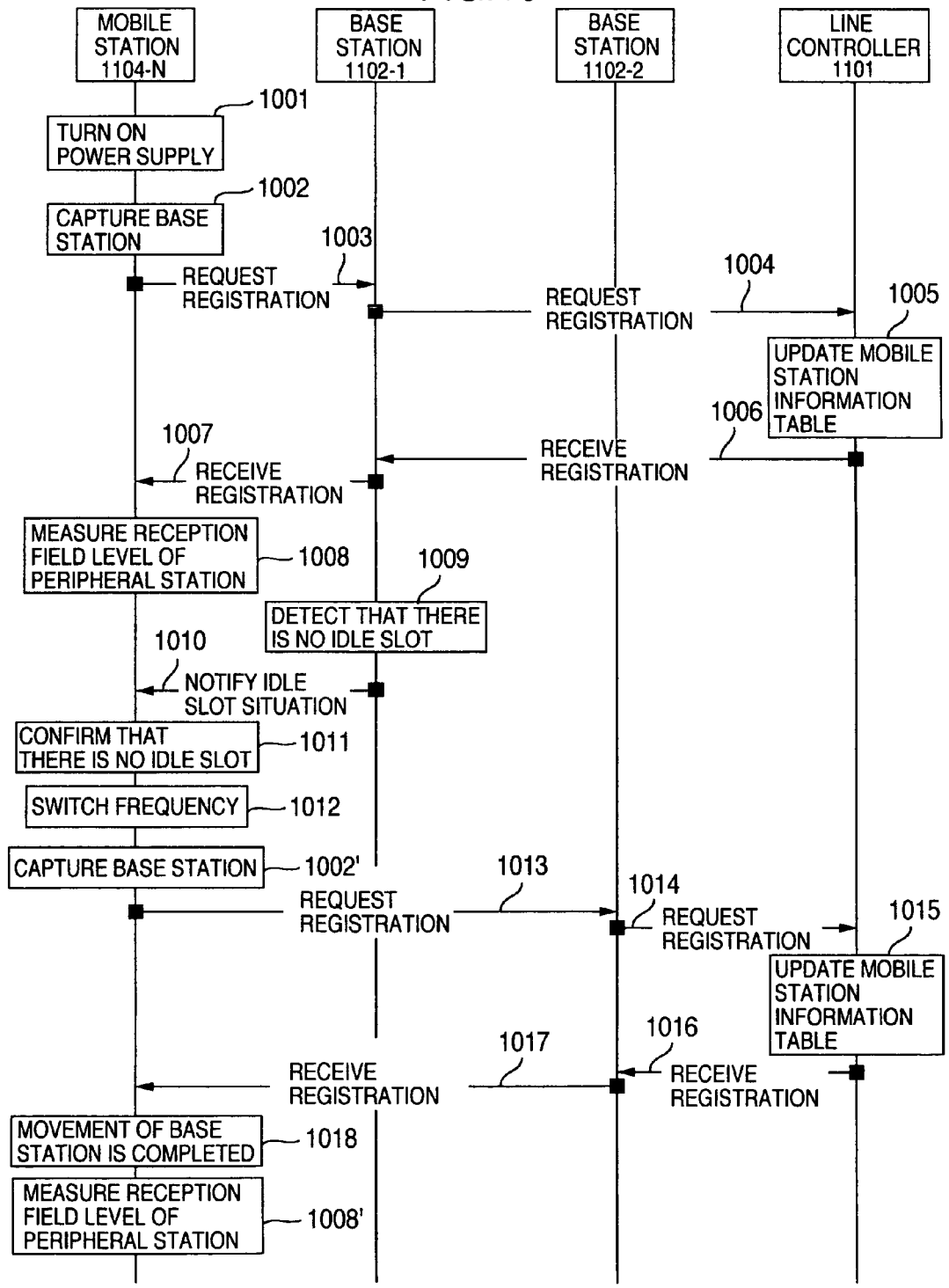
FIG. 10 is a diagram showing an operation sequence for explaining the embodiment shown in FIG. 9.

In the embodiment of FIG. 10, the operation sequence for changing the registration of the mobile station from a base station to another base station manually by the operator of the mobile station is now described with reference to FIG. 15.

Figure 15:
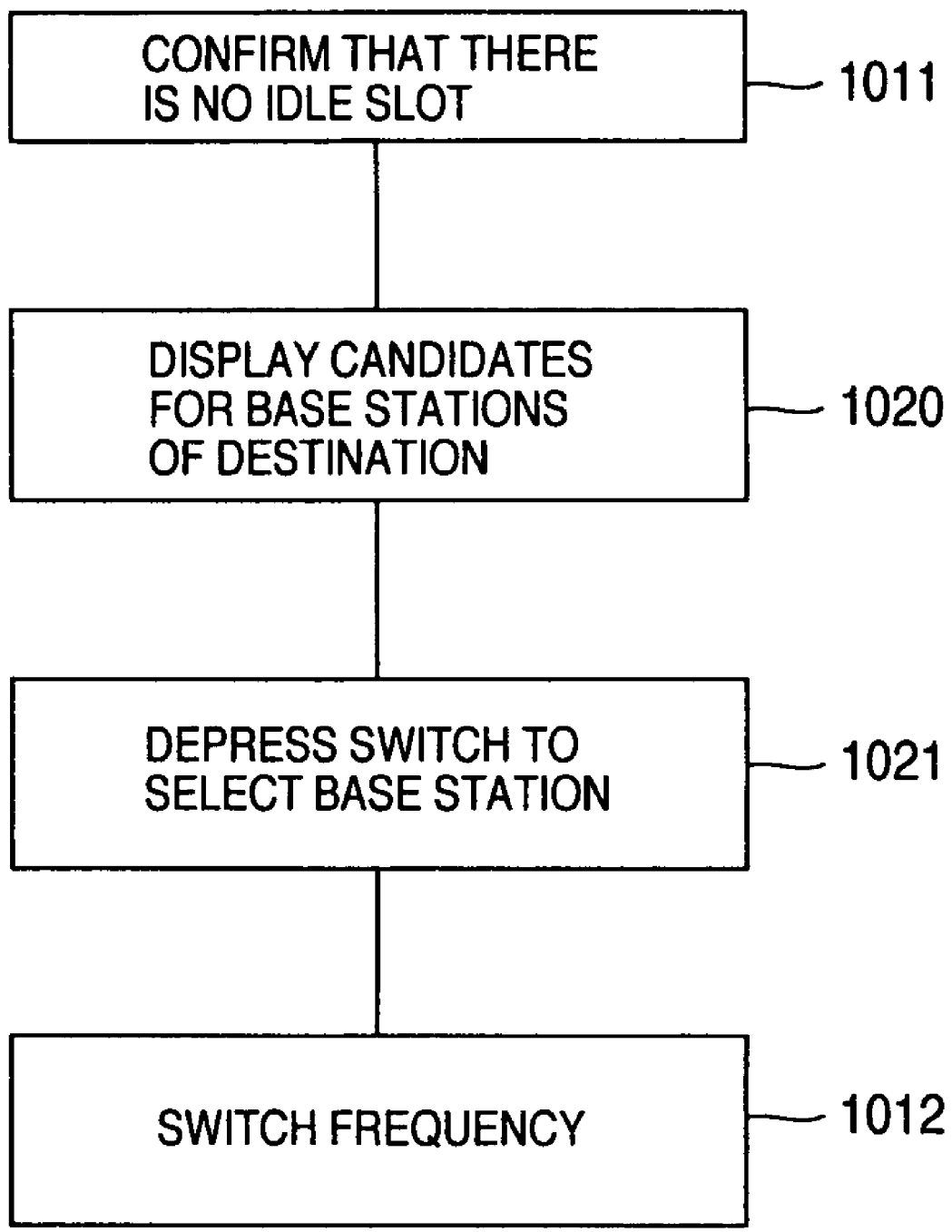
FIG. 15 is a flow chart showing a part of an operation sequence for explaining a modification example of the operation sequence of FIG. 10.

Processing operation in FIG. 15 is the same as in FIG. 10 with the exception that steps 1020 and 1021 are added between the steps 1011 and 1012 of FIG. 10. In FIG. 15, when it is confirmed that there is no idle slot in step 1011, the operator manually operates the operation/display unit 208 to display candidates for base stations of destination or the idle slot situation of other base stations in the display unit in step 1020. The operator selects any base station of destination from the displayed information and depresses a switch not shown in the operation/display unit 208 to select the base station in step 1021. Consequently, the frequency is switched in step 1012. Thereafter, the same processing operation as in steps 1002', 1013 to 1017 is performed and registration of the mobile station into the base station of destination is completed. In step 1008', the mobile station measures the reception field level of peripheral base station to judge whether the enough electric field strength to be able to make transmission and reception under control of the base station 1102-2 can be acquired or not and confirms that reception can be made normally.

As described above, according to the embodiment, whether the idle slot in the communication channel is present in the base station or not can be easily grasped in the mobile station within a predetermined communication area in the radio communication system having a plurality of base station zones. Further, the operator of the mobile station can operate to move the mobile station from the communication area or the mobile station can switch the communication area automatically to thereby make talking even at place or time that talking cannot be made, so that the radio communication system having the extremely high reliability and contributing to improvement of communication service or expansion of the communication area can be realized.

The foregoing description has been made to the embodiments of the present invention in detail, although the present invention is not limitd to the embodiments of the radio communication system described above and it is needless to say that the present invention can be widely applied to the radio communication system of SCPC type or any other type than that.

It should be further understood by those skilled in the art that various changes and modifications may be made without departing from the spirit of the invention and the scope of the appended claims.

The invention claimed is:

1. A radio communication system comprising:
a line controller;
a plurality of base stations connected to the line controller; and
a plurality of mobile stations connected to each of the plurality of base stations by a radio communication line having a control channel and a communication channel,
wherein each of the plurality of base stations includes a first control unit for monitoring whether there is any idle slot or not in a plurality of slots of the communication channel of the base station and the first control unit transmits first resultant monitored information containing information as to whether there is any idle slot or not in the communication channel of the base station to the plurality of mobile stations within a communication area of the base station at first predetermined intervals by the control channel,
wherein the first control unit of the base station acquires information as to whether there is any idle slot or not in the communication channel of other base stations and transmits the information to the plurality of mobile stations within the communication area of the base station by the control channel, and
wherein each of the plurality of mobile stations includes a display unit for displaying, for each of the communication channels of the base station and the other base stations, information as to whether there is any idle slot or not in the communication channel of the base station and the communication channel of each of the other base stations.

2. The radio communication system according to claim 1, wherein the line controller includes a second control unit for monitoring whether there is any idle slot or not in a plurality of slots of the communication channel for each of the plurality of base stations to produce second resultant monitored information and an interface for transmitting the second resultant monitored information to each of the plurality of base stations.

3. The radio communication system according to claim 2, wherein the line controller transmits the second resultant monitored information to each of the plurality of base stations at second predetermined intervals.

4. The radio communication system according to claim 2, wherein the line controller transmits the second resultant monitored information to each of the plurality of base stations when there is a change in the second resultant monitored information.

5. The radio communication system according to claim 2, wherein the first control unit of each base station produces the first resultant monitored information based on the second resultant monitored information from the line controller.

6. The radio communication system according to claim 1, wherein the first control unit of each base station monitors an occupancy situation of slots in the communication channel of the base station to produce the first resultant monitored information.

7. The radio communication system according to claim 1, wherein each of the plurality of mobile stations includes an operation part for permitting an operator of the mobile station to manually select any base station having idle slot based on the displayed information as to whether there is any idle slot or not in the communication channel of the base station and other base stations.

8. The radio communication system according to claim 1, wherein each of the plurality of mobile stations includes a third control unit for providing information as to whether there is any idle slot or not in the communication channel of the base station and other base stations and when the mobile station which is registered in the base station having no idle slot originates a call, the mobile station is automatically registered in another base station having idle slot based on the information as to whether there is any idle slot or not in the communication channel of other base stations.

9. The radio communication system according to claim 1, wherein the information as to whether there is any idle slot or not in the communication channel of other base stations is transmitted to the plurality of mobile stations within the communication area of the base station at third predetermined intervals.

10. A radio communication method in a radio communication system including a line controller, a plurality of base stations connected to the line controller and a plurality of mobile stations connected to each of the plurality of base stations by a radio communication line having a control channel and a communication channel, comprising the steps of:

monitoring by each of the plurality of base stations whether there is any idle slot or not in a plurality of slots of the communication channel of the base station to produce first resultant monitored information; and transmitting by the base station the first resultant monitored information to the plurality of mobile stations within a communication area of the base station at first predetermined intervals by the control channel, wherein the first control unit of the base station acquires information as to whether there is any idle slot or not in the communication channel of other base stations and transmits the information to the plurality of mobile stations within the communication area of the base station by the control channel, and wherein each of the plurality of mobile stations includes a display unit for displaying, for each of the communication channels of the base station and the other base stations, information as to whether there is any idle slot or not in the communication channel of the base station and the communication channel of each of the other base stations.

11. The radio communication method according to claim 10, wherein the line controller monitors whether there is any idle slot or not in a plurality of slots of the communication channel for each of the plurality of base stations to produce second resultant monitored information; and transmits the second resultant monitored information to each of the plurality of base stations at second predetermined intervals or when there is a change in the second resultant monitored information; and each of the plurality of base stations transmits the received second resultant monitored information to the plurality of mobile stations of the base station at third predetermined intervals.

12. The radio communication method according to claim 11, wherein each of the plurality of mobile stations of each base station receives the first and second resultant monitored information, and wherein each of the plurality of mobile stations displays information as to whether there is any idle slot or not in the communication channel of the base station and other base stations in a display unit of the mobile station and permits an operator of the mobile station to manually select any base station having idle slot based on the displayed information as to whether there is any idle slot or not.

13. The radio communication method according to claim 11, wherein each of the plurality of mobile stations of each base station receives the first and second resultant monitored information, and wherein when the mobile station which is registered in the base station having no idle slot originates a call, the mobile station is automatically registered in another base station having idle slot based on the second resultant monitored information.

\* \* \* \* \*